US011611616B1

(12) United States Patent
Gabrielson et al.

(10) Patent No.: US 11,611,616 B1
(45) Date of Patent: Mar. 21, 2023

(54) SERVICE AVAILABILITY ZONES FOR HIGH AVAILABILITY WORKLOADS

(71) Applicant: Amazon Technologies, Inc., Seattle, WA (US)

(72) Inventors: Jacob Adam Gabrielson, Seatlle, WA (US); Marcin Piotr Kowalski, Cape Town (ZA); Robert Martin Wise, Auburn, WA (US); Alec H. Peterson, Lake Forest Park, WA (US); Nathan Dye, Seattle, WA (US); Brian L. Barker, Brier, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/215,537

(22) Filed: Mar. 29, 2021

(51) Int. Cl.
*H04L 67/1095* (2022.01)
*H04L 67/52* (2022.01)

(52) U.S. Cl.
CPC .......... *H04L 67/1095* (2013.01); *H04L 67/52* (2022.05)

(58) Field of Classification Search
None
See application file for complete search history.

(56) References Cited

U.S. PATENT DOCUMENTS

| 8,868,766 | B1 | 10/2014 | Theimer et al. | |
|---|---|---|---|---|
| 9,116,888 | B1 * | 8/2015 | Wang | H04L 67/02 |
| 2017/0244593 | A1 * | 8/2017 | Rangasamy | H04L 67/02 |
| 2018/0150356 | A1 * | 5/2018 | Boshev | G06F 11/2094 |
| 2018/0270125 | A1 * | 9/2018 | Jain | G06F 16/00 |
| 2021/0382912 | A1 * | 12/2021 | Horowitz | H04L 63/166 |
| 2021/0406064 | A1 * | 12/2021 | Messick | G06F 9/466 |

* cited by examiner

*Primary Examiner* — Tonia L Dollinger
*Assistant Examiner* — Jonathan A Sparks
(74) *Attorney, Agent, or Firm* — Nicholson De Vos Webster & Elliott LLP

(57) ABSTRACT

Techniques are described for providing service availability zones for computing-related services provided by a cloud provider network. According to some embodiments, the use of service availability zones enables users to achieve greater availability assurance for workloads sensitive to downtime or outages. The sensitivity of such workloads to downtime may be due to financial, regulatory, safety, or other reasons. Such availability-sensitive applications may in some cases be configured to run in multiple regions of a cloud provider network to increase their availability compared to running in a single availability zone. However, for some applications, the implementation of an application across multiple regions may not be feasible or desirable. The use of service availability zones provides user-visible fault domains within a single region of a cloud provider network, thereby enabling users to readily and reliably achieve application layer availability of approximately 99.999% for a service within a single region.

18 Claims, 9 Drawing Sheets

SERVICE AVAILABILITY ZONES FOR HIGH AVAILABILITY WORKLOADS

BACKGROUND

Modern businesses and other organizations increasingly rely on a wide variety of computing systems and associated workloads to operate efficiently. The increased reliance on such computing systems has placed an importance on the availability of many types of workloads and associated data sets. In this context, availability generally refers to a level of operational performance, such as "uptime," in which a computing system and associated data is accessible. Several techniques are commonly used to increase the availability of computing systems and associated data sets such as, for example, utilizing redundant computing systems and workloads, efficiently detecting occurrences of failures, and providing efficient failover mechanisms.

BRIEF DESCRIPTION OF DRAWINGS

Various embodiments in accordance with the present disclosure will be described with reference to the drawings, in which.

DETAILED DESCRIPTION

Figure 1:
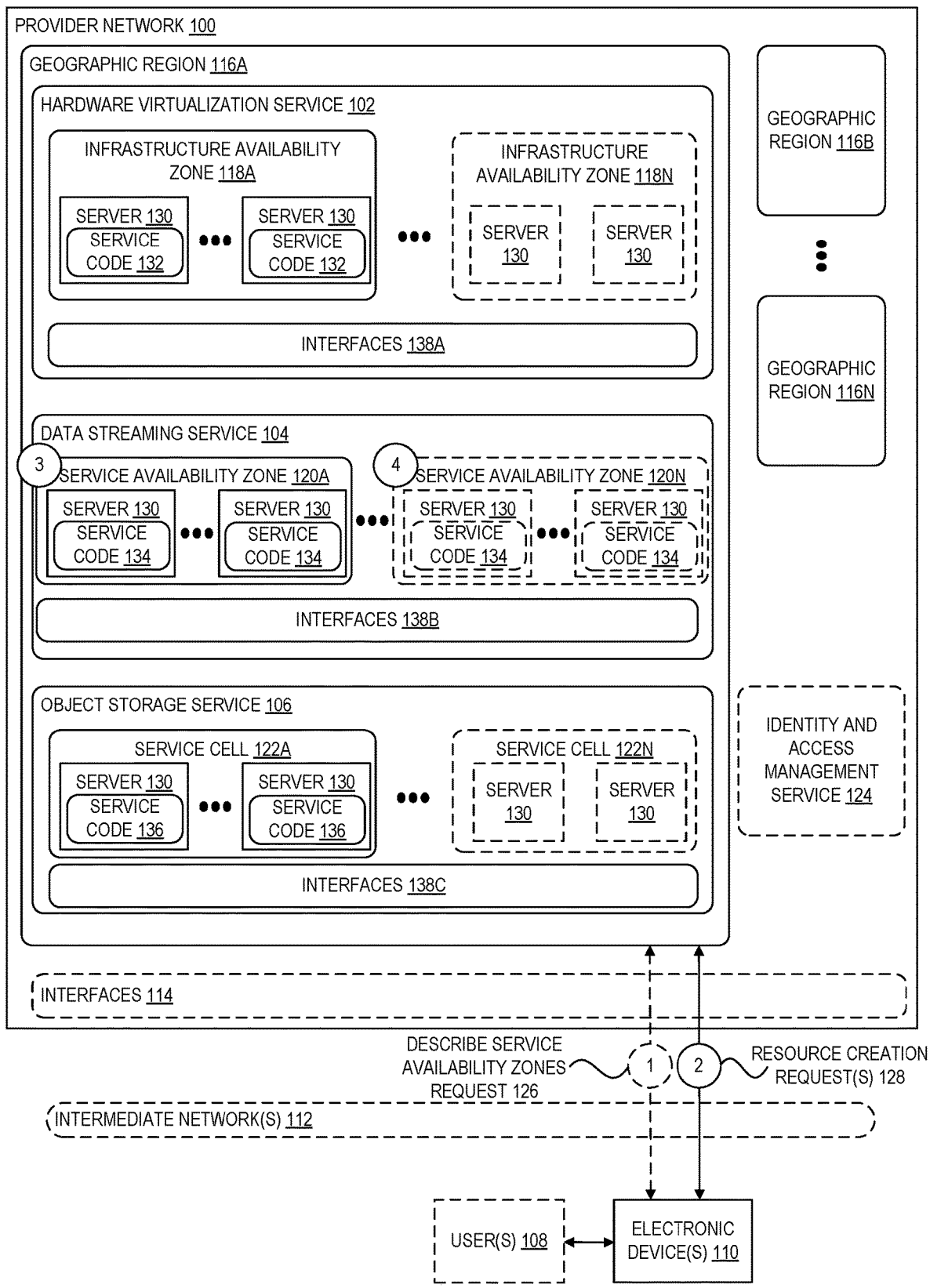
FIG. 1 is a diagram illustrating an environment for providing service availability zones in connection with various computing-related services provided by a cloud provider network according to some embodiments.

The present disclosure relates to techniques for providing high availability for software applications running on a cloud provider network. High availability refers to the ability to keep running even when some components fail. For applications running on the cloud, the different services that the application uses can be considered as some of its components. Highly available services can be designed to guarantee a certain percentage of uptime—for example, a service with "five-nines" availability will be available 99.999% of the time, with a downtime of less than 5.26 minutes in a year. The disclosed techniques can increase the resiliency of applications during these brief downtimes by providing multiple independent copies of services in a region, assigning those copies different identifiers (such as a name or color), and then matching up the identifiers across the different services that an application uses. An application can use two different identifiers (for example, green and blue) so that it will be run as two separate copies, one that only uses "green" services and another that only uses "blue" services. In this way, if a "blue" service goes down, the "green" copy of the application can continue to run.

As described herein, the use of such service cellularization and service cell mappings generally enables users of a cloud provider network to achieve greater availability assurance for workloads which may be sensitive to downtime or outages. In some cases, such applications may be implemented using resources configured to run in multiple regions of a cloud provider network to increase their availability compared to running in only a single region for region-wide services. However, for some applications and workloads, the implementation of resources across multiple regions may not be feasible or desirable due to increased latency, data consistency issues, data sovereignty requirements, or for other reasons. According to embodiments described herein, the use of service cell mappings provides user-visible, multi-service fault domains within individual regions of a cloud provider network, thereby enabling users to readily achieve application layer availability of approximately 99.999% without the need to replicate resources across multiple regions.

Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. A physical or infrastructure availability zone (also known as an availability domain, or simply a "zone") refers to an isolated failure domain including one or more data center facilities with separate power, separate networking, and separate cooling from those in another availability zone. Preferably, physical availability zones within a region are positioned far enough away from one other that the same natural disaster should not take more than one availability zone offline at the same time, but close enough together to meet a latency requirement for intra-region communications.

Furthermore, regions of a cloud provider network are connected to a global "backbone" network which includes private networking infrastructure (e.g., fiber connections controlled by the cloud provider) connecting each region to at least one other region. This infrastructure design enables users of a cloud provider network to design their applications to run in physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

Some services of a cloud provider network may not however include physical availability zone constructs that enable users to deploy independent copies of computing resources in a single region of the cloud provider network (e.g., some data streaming services, message queuing services, database services, etc., that may represent higher-level services). While users might be able to increase the fault tolerance of resources provided by such services by spreading the resources across multiple regions, as indicated above, the deployment of resources into multiple regions may not be desirable in all cases because of increased latency, data consistency concerns, or for other reasons. Some cloud provider networks further implement services using a cell-based architecture to further reduce the blast radius of service failures. However, the redundancy of a cell-based architecture may not apply transitively between services, nor can customers reason about the placement of resources into a cell-based architecture in many cases.

The aforementioned challenges, among others, are addressed in some embodiments by the disclosed technology for enabling regional services of a cloud provider network to provide service availability zones within regions of the cloud provider network, where each service availability zone corresponds to a logically isolated set of services. Each of these logically isolated sets of services of the service provides a fault domain that is independent from the other logically isolated sets of the service. Each of the multiple cells for a service can receive a designation (such as a color, number, name, or other distinct identifier) such that a customer account or workload can be mapped to the same cell designation across all services which it uses. In this manner, users can deploy redundant copies of their workloads across multiple cell designations to obtain a greater degree of fault tolerance within a single region. Furthermore, a cloud provider network applies the use of service cell mappings transitively such that a particular cell designation of a first service is configured to rely on the same cell designation of downstream services upon which the first service may rely.

As used herein, a "workload" refers to a set of resources that cooperate to perform a certain task or provide a desired functionality, such as a customer-facing application or back-end process. Resources can refer to virtual machine instances, containers, storage volumes, virtual network cards, or other virtual or physical resources of a cloud provider network that are made available to customers via its services. It will be appreciated that the disclosed techniques provide benefits for workloads as well as for individual resources, for example by enabling a customer to run two copies of the same workload or resource in different service availability zones for greater fault tolerance. The logically independent sets of services that form service availability zones as described herein can include one or more compute services (including virtual machine services, containers services, serverless function services, and quantum computing services), storage services (including volume storage services, file storage services, and object storage services), database services, networking services, identity access and management services, security services, data streaming services, data analytics services, machine learning services, cryptographic services, blockchain services, gaming services, mobile services, Internet of Things (IoT) services, media services, satellite services, robotics services, and augmented and virtual reality (AR/VR) services. Although embodiments are described herein in the context of regional services, similar logically isolated service sets can be provided at other levels of granularity within a cloud provider network, for example within availability zones, data centers, or edge locations.

FIG. 1 is a diagram illustrating an environment for providing service availability zones in connection with various computing-related services provided by a cloud provider network according to some embodiments. A provider network 100 (or "cloud" provider network) provides users with the ability to utilize one or more of a variety of types of computing-related resources such as compute resources (e.g., executing virtual machine (VM) instances or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service 102 that can execute compute instances, a data streaming service 104 providing real-time data streaming resources, an object storage service 106 providing object data storage, etc. The users (or "customers") of provider networks 100 can utilize one or more user accounts that are associated with a customer account, though these terms may be used somewhat interchangeably depending upon the context of use. Users (e.g., users 108) can interact with a provider network 100 using electronic devices 110 and across one or more intermediate networks 112 (e.g., the internet) via one or more interface(s) 114, such as through use of application programming interface (API) calls, via a console implemented as a website or application, etc. The interface(s) 114 can be part of, or serve as a front-end to, a control plane of the provider network 100 that includes "backend" services supporting and enabling the services that are directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions (e.g., geographic regions 116A-116N), where a region is a geographical area in which the cloud provider clusters data centers. Each region includes multiple (e.g., two or more) infrastructure or physical availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time. For example, the hardware virtualization service 102 is shown as being distributed across multiple infrastructure availability zones 118A-118N, where service code 132 used to implement the service is distributed across servers 130 in each infrastructure availability zone. Depending on the implementation of a given service of a cloud provider network 100, a service may or may not expose infrastructure availability zones available for use. For example, while the hardware virtualization service 102 provides infrastructure availability zones 118A, in this example, the data streaming service 104 (the implementation of which can rely in part on the hardware virtualization service 102) may not expose separate infrastructure availability zones into which users can deploy separate data streaming resources.

Customers can connect to AZ of the cloud provider network 100 via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user can directly utilize a compute resource (e.g., provided by a hardware virtualization service) hosted by the provider network to perform a variety of computing tasks. Additionally, or alternatively, a user can indirectly utilize a compute resource by submitting code to be executed by the provider network (e.g., via an on-demand code execution service), which in turn utilizes one or more compute resources to execute the code - typically without the user having any control of or knowledge of the underlying compute instance(s) involved.

The hardware virtualization service 102, for example, (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

As indicated above, while some services may provide infrastructure or physical availability zones, other services (sometimes referred to herein as regional services) may not expose separate infrastructure availability zones into which users can request deployment of resources into separate fault domains within a single region. According to embodiments described herein, some or all services of a cloud provider network 100 provide isolated service availability zones, such as the example service availability zones 120A-120N of a data streaming service 104 (in general, such service availability zones can be associated with any service of the cloud provider network 100). Each service availability zone includes an isolated instance of the service at which users can deploy and use resources, e.g., implemented on servers 130 hosting service code 134 and distributed across the service availability zones 120A-120N. In this manner, users can deploy redundant resources across multiple service availability zones for higher availability. The service availability zones are isolated from one another logically, e.g., at the service- or application-layer and may be distributed across one or more underlying physical availability zones, data centers, other infrastructure sites, or along other boundaries. The independence of the service availability zones can be maintained at least in part by using one or more of the following techniques: separately deploying updates to each copy of the service in the respective service availability zones (for example, by staggering the times at which the same update is rolled out across the service availability zones), managing the independent use of hardware infrastructure by each separate copy of the service (for example, by running different service availability zones in different physical availability zones, or using physically separate hardware within a single physical availability zone), avoiding common dependencies between different service availability zones (e.g., cell designation A of service X and cell designation B of service X should not both have a dependency on the same cell of service Y), staggering scheduled service outages, managing the placement of certain users' or organizations of users' workloads into particular service availability zones, and the like.

In some embodiments, some or all services of the cloud provider network 100 can be architected using a cell-based architecture. A service implemented using a cell-based architecture is deployed as a collection of "cells," where each cell includes a complete and independent instance of the service and is associated with a fixed maximum size. Rather than scaling the size of a single-image system, a service implemented using a cell-based architecture can scale by adding more fixed-size cell each time the capacity of the existing scales nears full capacity. In some embodiments, these services further include one or more thin service layers configured to route control plane and data plane traffic to the appropriate cells. In general, the existence of cells may be not exposed to users of the service and instead represents a backend implementation detail. Users thus generally may not be able to reason about the placement of their resources into particular cells or to architect their workloads to make use of the inherent fault domains provided by the cell-based architecture. In some embodiments, the use of a cell-based architecture is complementary with the implementation of service availability zones, where a service can be implemented in each service availability zone using a cell-based architecture. As shown in FIG. 1, the object storage service 106 is implemented by one or more service cells 122A-122N in the geographic region 116A. Although not depicted, the control planes and data planes of the hardware virtualization service 102, data streaming service 104, and other services of the provided network 100 can also be implemented using a cell-based architecture.

As indicated above, availability zones provide isolation guarantees around physical infrastructure, including buildings, cooling, and electricity. Services can thus be architected in a manner that is availability zone "siloed," meaning that the resources in an availability zone depend only on resources within that availability zone. Users can then construct highly available applications using compute instances or other resources (e.g., databases, networking resources, etc.) in multiple availability zones as an issue with a single availability zone would only affect a portion of the application's instances. Service availability zones provide similar isolation guarantees to availability zones but exist at the service- or application- layer instead of the physical infrastructure layer. For instance, the service availability zones of a service may provide guarantees that they share no server infrastructure with one another but may not necessarily guarantee that server infrastructure for each service availability zone is entirely physically isolated (although in some cases this may be true). Thus, while separate service availability zones may share common availability zone infrastructure in some cases, each service availability zone alone is able to handle an issue with an underlying availability zone, all without violating any of service availability zone software isolation guarantees.

Figure 2:
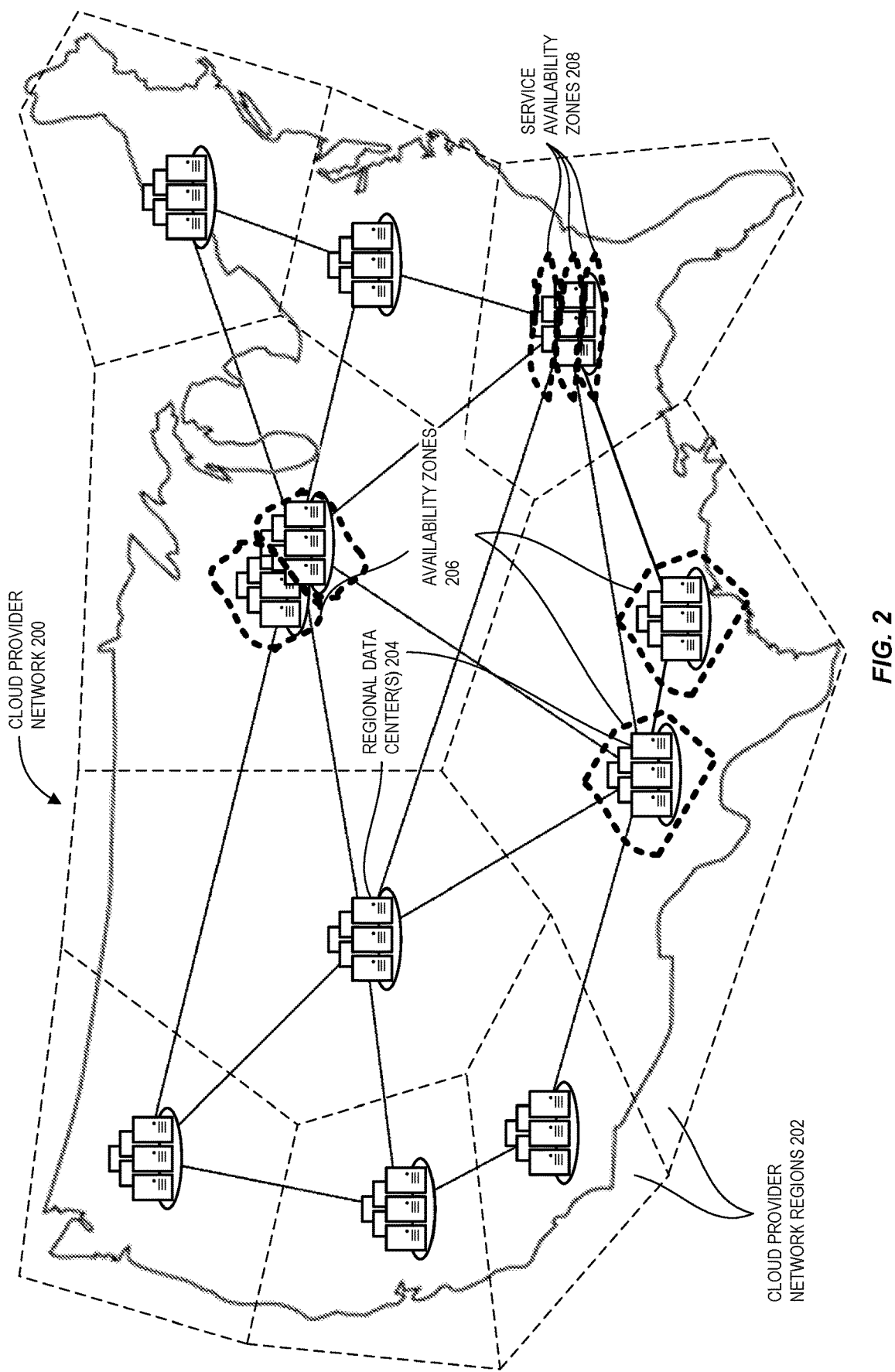
FIG. 2 illustrates an exemplary map of cloud provider network geographic regions, availability zones, and service availability zones according to some embodiments.

FIG. 2 illustrates an exemplary map of cloud provider network geographic regions, physical availability zones, and service availability zones according to some embodiments. As indicated above and as illustrated, a cloud provider network 200 can be formed as several geographic regions 202, where a region is a separate geographical area in which the cloud provider has one or more data centers 204. Each region 202 can further include two or more availability zones (AZs) 206 connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the public internet, a cellular communication network, a communications service provider network). Transit Centers (TC) are the primary backbone locations linking customers to the cloud provider network and may be co-located at other network provider facilities (e.g., Internet service providers, telecommunications providers). Each region can operate two or more TCs for redundancy.

In some embodiments, one or more services of a cloud provider network 200 further includes a plurality of service availability zones 208 within one of the geographic regions 202 (and a service can include a separate set of service availability zones in some or all the regions of the cloud provider network). As indicated above, a service availability zone 208 also represents an isolated failure domain and can be implemented at one or more data centers that are co-located with data centers of an existing region 202 or availability zone. Whereas the AZs 206 represent isolated infrastructure-based fault domains, the service availability zones instead represent application- or service-layer isolated instances of a service within a region which can be implemented across one or more separate infrastructure sites. For example, in some embodiments, a service availability zone 208 also represents an isolated failure domain including separate hardware and software resources relative to other service availability zones.

As indicated above, if a user has developed an availability-sensitive system or workload that the user plans to deploy using resources provided a cloud provider network, the user may strive to implement the workload at the cloud provider network 100 in manner that provides for maximum availability or uptime. In this example, the user can deploy their workload across multiple regions (e.g., across two or more of regions 202); however, deploying some workloads across multiple regions may not be feasible or desirable, or a user might generally desire additional availability assurance within any given region. According to embodiments described herein, users can instead deploy workloads or particular resources across multiple service availability zones to achieve greater workload or system availability.

Referring again to FIG. 1, the numbered circles "1"-"4" illustrate a process that includes a service of a cloud provider network 100 optionally receiving a request to describe the service availability zones provided within a specified region, providing a response identifying available service availability zones, receiving requests to create a resource (e.g., a compute resource, a database, a networking resource, a data streaming resource, etc.) at two or more service availability zones, and creating the computing resources within the specified service availability zones. In some embodiments, at circle "1," a data streaming service 104, for example, receives a request 126 to describe available service availability zones associated with the data streaming service. For example, the data streaming service 104 can receive the request from an electronic device 110 based on a user's 108 desire to deploy data streaming resources at two or more separate service availability zones of the data streaming service 104 within a particular region of the cloud provider network 100.

In some embodiments, responsive to the request 126 to describe the service availability zones, the data streaming service 104 responds with information identifying each of the available service availability zones 120A-120N. In some embodiments, each of the service availability zones can be identified by a text-based identifier (e.g., a name of a color, a numerical identifier, arbitrary names, etc.) or based on any other set of distinct identifiers. The identifiers of each of the service availability zones can be used to identify corresponding service availability zones implemented across multiple services of the cloud provider network 100. For example, the data streaming service 104 might include a "blue" service availability zone and an object storage service 106 might also include a corresponding "blue" service availability zone. In some embodiments, each service can include a same number of logically independent cells or service availability zones as other services. In other embodiments, different services may include different numbers of logically independent cells or service availability zones compared to other services.

In some embodiments, at circle "2," the data streaming service 104 receives one or more resource creation requests 128 to create resources in specified service availability zones. In some embodiments, a resource creation request 128 includes an identifier of a service availability zone in which the user desires to create the resource. In some embodiments, at least a portion of a request is encrypted using an encryption key to which only components (e.g., various computing resources used to implement the service) in a corresponding service availability zone can access. For example, as part of sending a request involving a resource in a "blue" service availability zone, the request can be encrypted using an encryption key (e.g., obtained from a key management service or other source) that is only accessible to components of the "blue" service availability zone (and to components of "blue" availability zones associated with other services of the cloud provider network 100). In other embodiments, an identifier of a service availability zone can be included as part of authentication information obtained from an identity and access management service 124 (e.g., an entity or resource can authenticate as a "blue" service availability zone resource and obtain authentication information that the entity can use in requests to identify as a component of a "blue" service availability zone). In some embodiments, the request is routed to an appropriate service availability zone by interfaces 138C (and similarly by interfaces 138A and 138B for other services).

In some embodiments, at circle "3," assuming the request identified service availability zone 120A, the data streaming service 104 creates a first resource in the service availability zone 120A. For example, the service code 134 running on the servers 130 in service availability zone 120A creates the resource using only infrastructure and other resources associated with the service availability zone 120A. As indicated above, such infrastructure and other resources is independent from the infrastructure and resources used to implement independent copies of the service and associated resources in other service availability zones. The resource, for example, may be a component of a workload designed by a user of the cloud provider network 100 and for which high availability is desired.

In some embodiments, at circle "4," the data streaming service 104 creates a second resource in the separate service availability zone 120N (e.g., assuming the user caused a request to be sent identifying service availability zone 120N). The second resource, for example, can be a redundant copy of the first resource such that the second resource can be used in the case of a failure or unavailability of the first resource. The creation of the second resource can be responsive to a same or different request as that used to create the first resource. For example, a user can submit a separate resource request 128 specifying a different service availability zone as compared to the first resource (e.g., where the first resource is in a "blue" service availability zone and the second resource is in a "red" service availability zone). The second resource can thus be configured as a backup for the first resource in the event that the first resource or first service availability zone experiences a failure or unavailability. In some embodiments, the service can coordinate the replication of changes to the first resource (e.g., a primary resource) to the second resource (e.g., a backup resource) such that a failure associated with the first resource can be mitigated by executing a failover workflow that causes the second resource to become the primary resource.

Although the example described above includes a user identifying specific service availability zones into which it is desired to create resources, in other embodiments, the use of service availability zones can involve processes managed by the cloud provider network 100 and without explicit user input. For example, in some embodiments, a service of the cloud provider network 100 can be configured to distribute workloads associated with separate users or separate organizations of users of the cloud provider network across service availability zones to minimize the impact of service issues stemming from users' workloads. As another example, in some embodiments, users can define "placement groups" for their resources, where a placement group can be associated with a placement strategy such as clustering resources within service availability zones or partitioning resources across service availability zones. In this example, a service can manage the placement of resources across service availability zones according to a users' defined placement group preferences and without requiring the user to specify particular service availability zones to be used.

Figure 3:
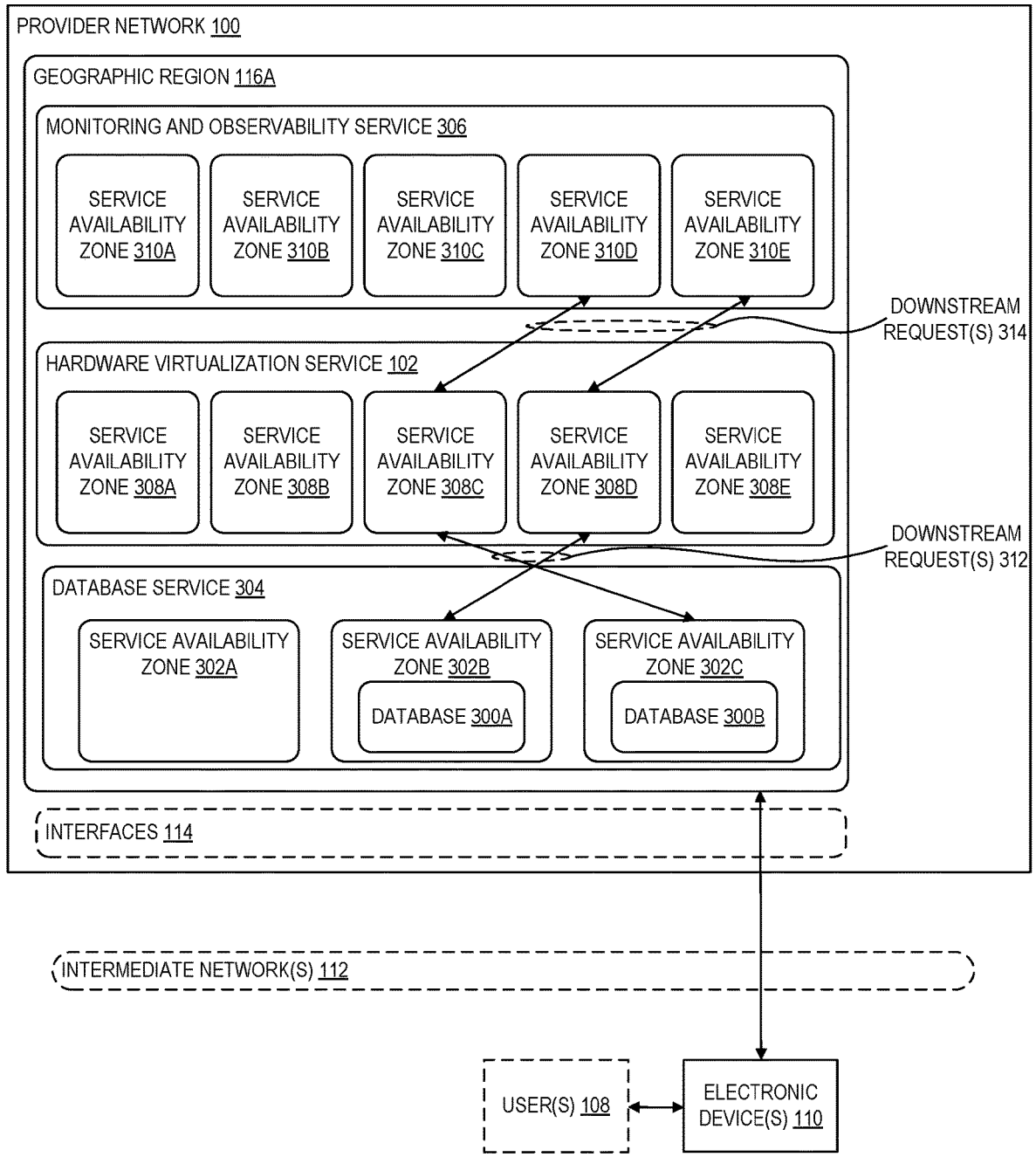
FIG. 3 is a diagram illustrating the transitive use of service availability zones by services of a cloud provider network to provide improved fault tolerance according to some embodiments.

FIG. 3 is a diagram illustrating the transitive use of service availability zones by services of a cloud provider network to provide improved fault tolerance according to some embodiments. In this example, a database 300A has been created in a service availability zone 302B and a redundant copy of the database 300B has been created in a service availability zone 302C (where the database service 304 includes a set of service availability zones 302A-302C).

In some embodiments, the components of a service availability zone include an identifier of an originating service availability zone when sending requests to other downstream services upon which a service relies. In the example of FIG. 3, a database service 304 relies on a hardware virtualization service 102 as part of its implementation (e.g., illustrated by downstream requests 312 to hardware virtualization service 102 including service availability zones 308A-308E), which in turn further relies on a monitoring and observability service 306 (e.g., as illustrated by downstream requests 314 to monitoring and observability service 306 including service availability zones 310A-310E). Requests sent from components in the service availability zone 302B to the hardware virtualization service 102 include an identifier of the service availability zone (e.g., a "green" service availability zone) and requests from components of the service availability zone 302C similarly identify the service availability zone (e.g., the "red" service availability zone). In some embodiments, the hardware virtualization service 102 can thus direct the requests to corresponding service availability zones 308A-308E of the hardware virtualization service (e.g., to a "green" and "red" service availability zone, respectively). In this manner, the fault isolation provided by service availability zones in one service can be maintained transitively as services use other services as part of their implementation. For example, a failure of the "green" service availability zone of the hardware virtualization service 102 affects only databases in the "green" service availability zone of the database service 304, and failover can be performed to a database in the "red" service availability zone which relies on a separate "red" service availability zone of the hardware virtualization service 102, thereby minimizing the radius of failure for resources of the database service 304.

As shown, each service can include a different number of service availability zones compared to others and thus various hashing techniques can be used to map service availability zones from one service to another. For example, a consistent hash sharding algorithm or other techniques can be used to enable services to use different isolation factors while maintaining consistent blast radius "columns" within each of those services. In some embodiments, a provider network 100 pre-assigns certain users or organization of users to service availability zone identifiers (e.g., a customer A and its future resources might be pre-assigned to "blue" service availability zones, while a customer B and its future resources might be pre-assigned to "green" service availability zones) such that future resources created by the users or organizations of users are automatically associated with the assigned service availability zone identifier and directed to a logically isolated instance of each service accordingly. For example, a customer pre-assigned to "blue" service availability zones will be automatically directed to corresponding service availability zones of services at which the customer creates resources. The provider network 100 distributes the explicit assignments of users to service availability zones to those services providing service availability zones to ensure that such users are properly assigned across the provider network 100, thereby enabling services to support a different number of service availability zones while still maintaining an overall "columnar" assignment across service availability zones.

In some embodiments, the inclusion of service availability zone identifiers in user and service requests can be implemented automatically by the service, by a thin software layer installed as part of user workloads, as part of authentication resources managed by an identity and access management service 124 or using other mechanisms. In some embodiments, the routing of requests to an appropriate service availability zone is implemented in part by a service mesh (e.g., an intermediary service of the cloud provider network 100 that manages service-to-service communications) to which requests are directed and routed based on a service availability zone identifier included in the requests.

Figure 4:
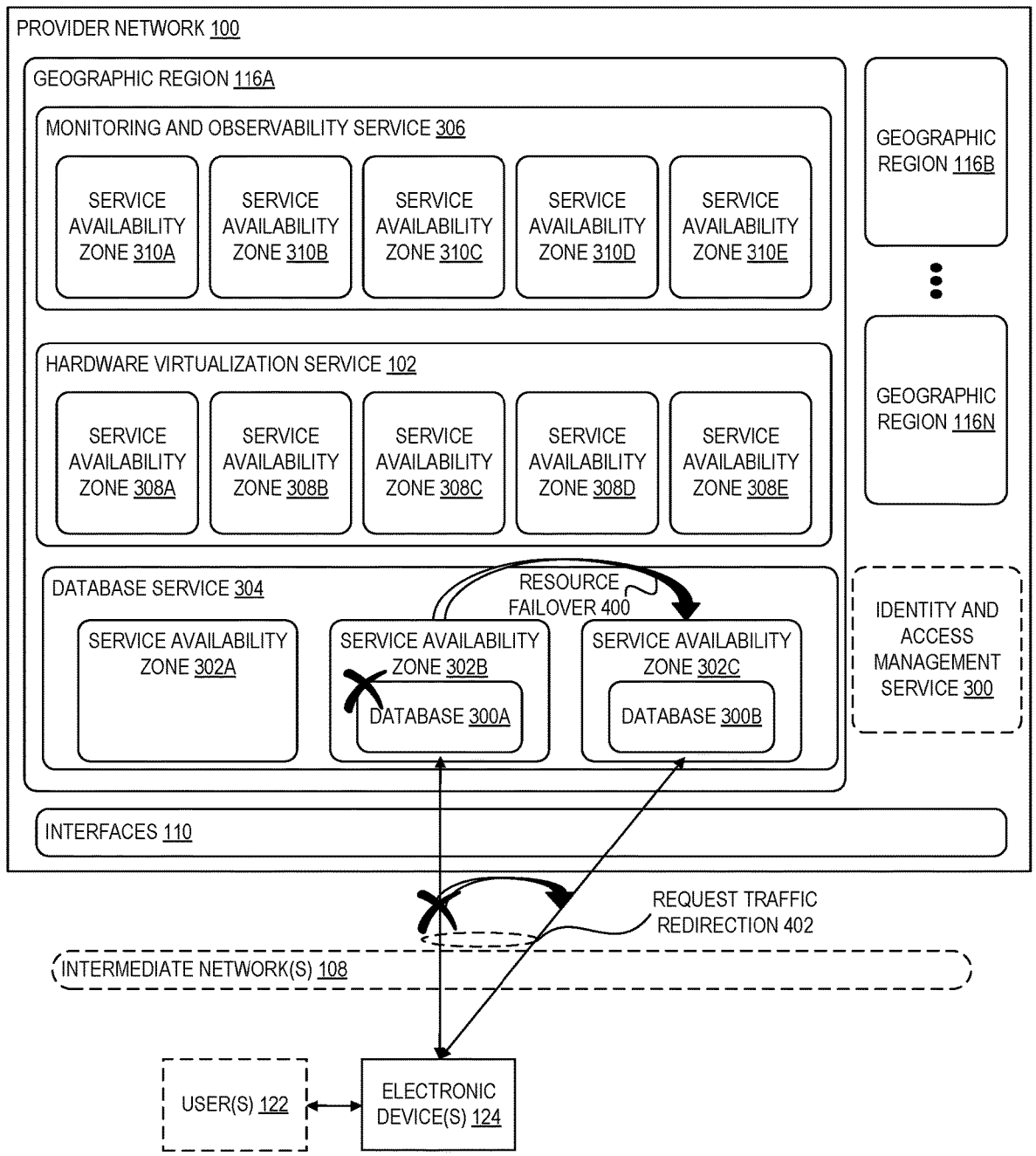
FIG. 4 is a diagram illustrating the failover of resources deployed across multiple service availability zones of a regional service of a cloud provider network according to some embodiments.

FIG. 4 is a diagram illustrating the failover of resources deployed in a first service availability zone to a second service availability zone of a regional service according to some embodiments. In this example, a user's workload is implemented in part using a database that has been deployed in each of a first service availability zone 302B and a second service availability zone 302C, e.g., as described above in relation to FIG. 1. Upon detecting a failure or unavailability of the database 300A, a failover workflow 400 is executed which causes, among other possible operations, request traffic destined for the database 300A to be redirected 402 to the database 300B. According to various embodiments, the creation and execution of the failover workflow 400 can be managed by the user that created the resource (e.g., a custom failover workflow can be created by the user as part of the implementation of the workload) or the failover processes may be managed automatically by the service.

Figure 5:
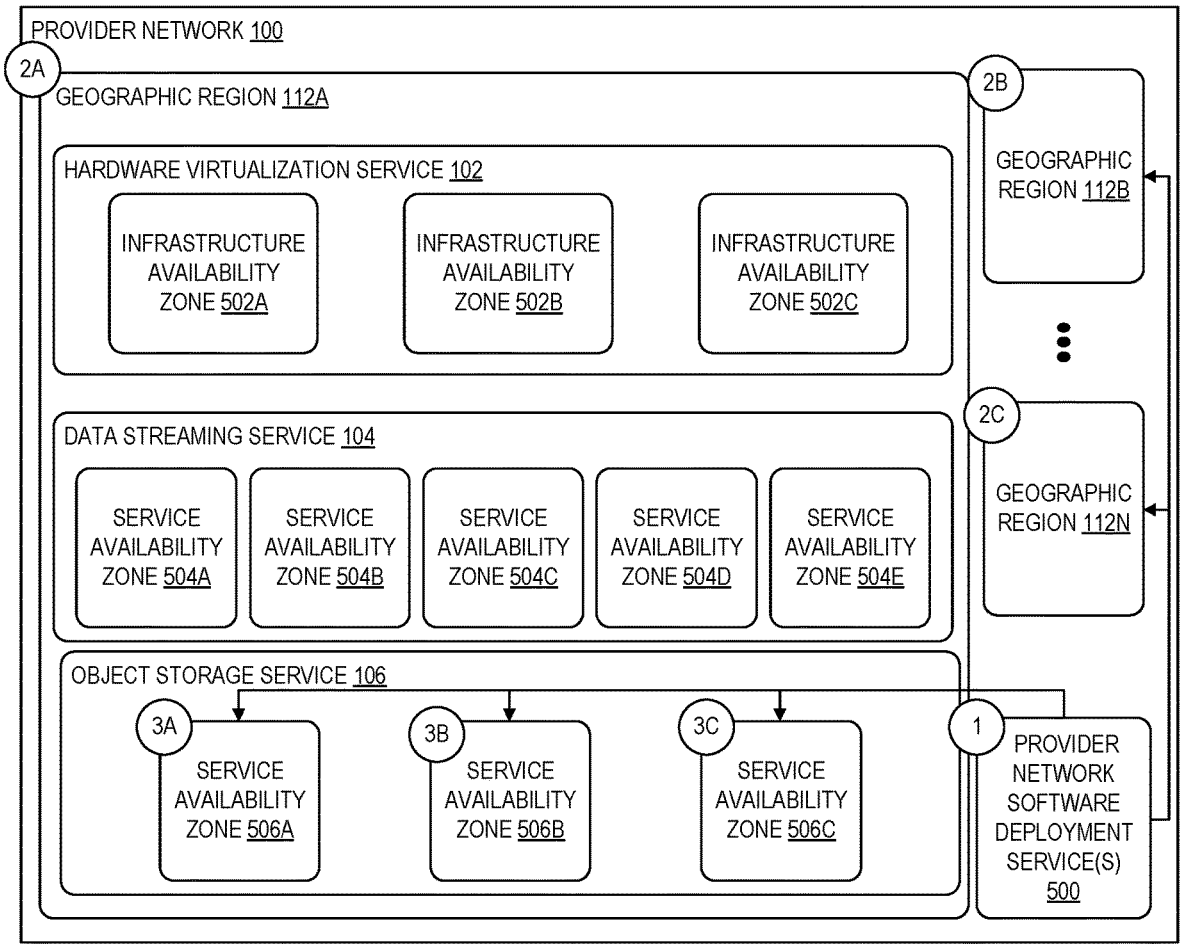
FIG. 5 is a diagram illustrating a cloud provider environment in which a software deployment service staggers the deployment of software updates to one or more of: separate geographic regions, physical availability zones, and service availability zones, according to some embodiments.

FIG. 5 is a diagram illustrating a cloud provider environment in which a software deployment service schedules the deployment of software updates to geographic regions, availability zones, and service availability zones in a manner that minimizes the likelihood of coordinated failures according to some embodiments. In some embodiments, the software deployment service(s) 500 execute using computing resources that are globally accessible to resources running in geographic regions 112A-112, execute using computing resources located in one or more geographic regions 112A-112N, or any combination thereof. For example, in some embodiments, each of geographic regions 112A-112N includes software deployment service components that operate in a federated fashion to manage the deployment of software updates, possibly under the coordination of one or more centralized, global software deployment service components 500.

As indicated above, in some embodiments, the software deployment service 500 controls when a software update is deployed to a service in geographic regions 112A-112N and to each of the service availability zones within a region. For example, the software deployment service 500 can stage the deployment such that any updates to a service are deployed to each region and to each service availability zone within a region at a separate time. In this manner, if there is a software defect in the update, or if some other aspect of the systems hosting the service cause an impairment, the impairment can hopefully be detected and resolved prior to its introduction to all regions and service availability zones.

In some embodiments, at circle "1," the software deployment service 500 identifies an update or any other operational impact event to be deployed to the service software implementing an object storage service 106. In this example, at circles "2A"-"2C," the software deployment service 500 deploys the update to servers operating in one or more of the geographic regions 112A-112N according to the deployment plan. In some embodiments, the servers 118 running software supporting a service include a software agent (e.g., an agent) running on the server that is capable of communicating with a software deployment service 500, obtaining software updates, staging the software updates locally on the server, and upgrading the software when instructed.

In some embodiments, the software deployment service 500 thus orchestrates the deployment of software updates in coordination with the agents running on the servers hosting the service software. In some embodiments, the deployment of an update includes sending update files to the agent and one or more scripts to run on each instance during the deployment. In some embodiments, the software deployment service 500 informs the servers that an update is available and instructs the servers when to install the update; in other embodiments, the servers in the regions periodically query the software deployment service 120 for updates and install the updates when available. In some embodiments, the process of carrying out the deployment plan is enforced programmatically by the software deployment service 500 and associated systems. For example, the software deployment service 500 can check with a calendar-based system or other mechanism that determines when the update can be deployed to each region.

In some embodiments, at circles "3A"-"3B," the software deployment service 500 similarly deploys the update to servers operating in one or more of the service availability zones 506A-506C according to the deployment plan (and similarly for service availability zones 504A-504E of the data streaming service 104). In this manner, the update is deployed to each of the service availability zones in a staggered manner such that errors can be identified before deploying an update to all copies of the service within a region.

Figure 6:
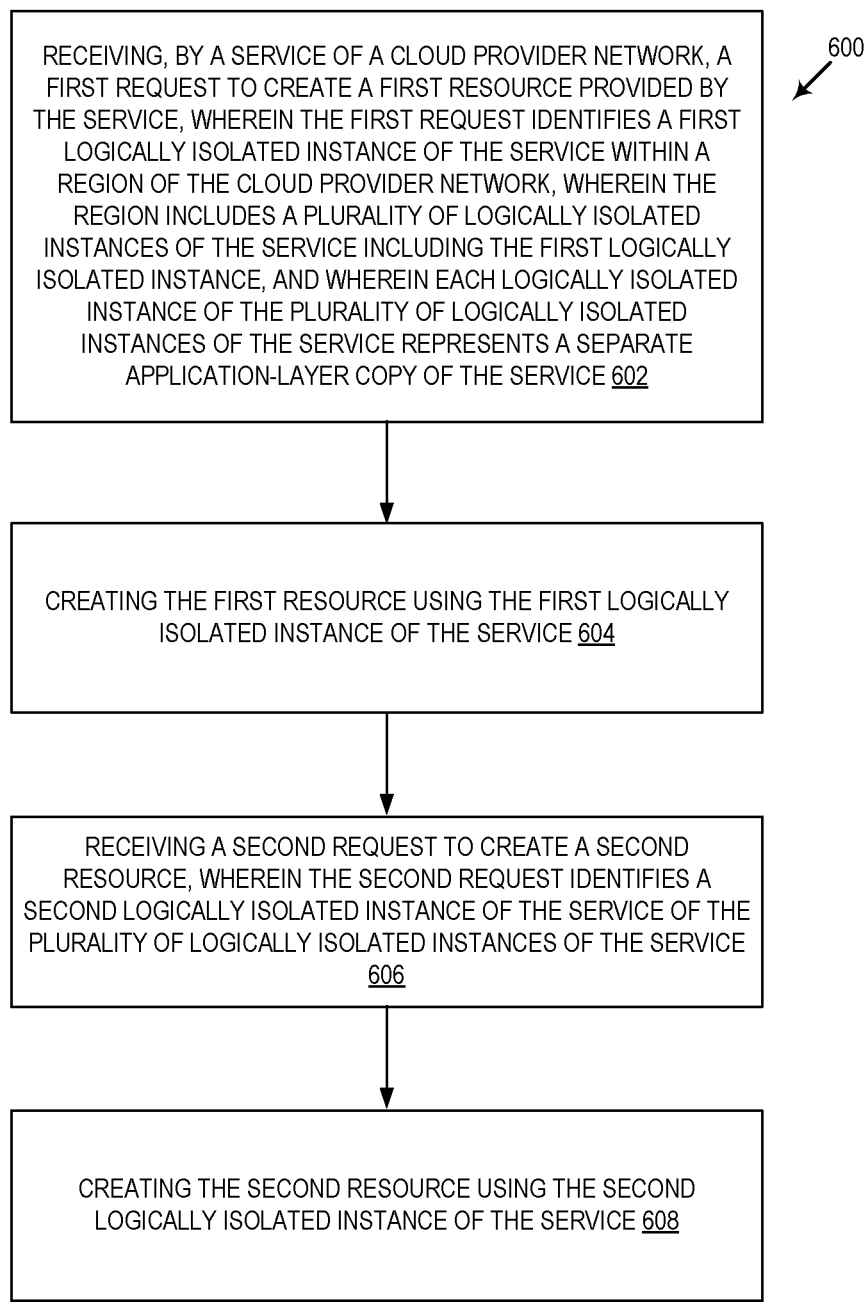
FIG. 6 is a flow diagram illustrating operations of a method for providing service availability zones for computing-related services provided by a cloud provider network according to some embodiments.

FIG. 6 is a flow diagram illustrating operations of a method for providing service availability zones for computing-related services provided by a cloud provider network according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by services of a cloud provider network 100 of the other figures.

The operations 600 include, at block 602, receiving, by a service of a cloud provider network, a first request to create a first resource provided by the service, wherein the first request identifies a first logically isolated instance of the service within a region of the cloud provider network, wherein the region includes a plurality of logically isolated instances of the service including the first logically isolated instance, and wherein each logically isolated instance of the plurality of logically isolated instances of the service represents a separate application-layer copy of the service. For example, a request to create a resource within a service availability zone can occur because it originates from a certain user account that is associated with the identifier of the service cells of that logically isolated set of services. In such examples, the account can be assigned to the cell identifier such that any resources created in that account are assigned to the cell identifier (and thus are all created within one service availability zone). As another example, a user can be able to specify a cell designation or service availability zones identifier for a particular workload to cause that workload to be run using only service cells of the specified designation. Specifying multiple designations can cause independent copies of the workload to be launched in each of the specified designations. A user can provide specific cell designation(s) or service availability zone(s) as a parameter in a template used to launch the workload or via an API call when launching the workload, or a user can provide an indication to run their workload in a highly available mode across two or more service availability zones without specifying any particular service availability zone or cell designation, for example by specifying a high availability parameter in with their workload template or via an API call when launching the workload.

The operations 600 further include, at block 604, creating the first resource using a first logically isolated instance of the regional service associated with the first service availability zone of the plurality of service availability zones.

The operations 600 further include, at block 606, receiving a second API request to create a second resource, wherein the second API request identifies a second service availability zone of the plurality of service availability zones, and wherein the second resource represents a redundant copy of the first resource.

The operations 600 further include, at block 608, creating the second resource using a second logically isolated instance of the regional service associated with the second service availability zone of the plurality of service availability zones.

In some embodiments, wherein the service is a first service of a plurality of services provided by the cloud provider network, and wherein the operations further include: sending, by a first component of the first service and to a second service of the plurality of services, a third API request involving the first resource, wherein the third API request identifies the first logically isolated instance of the service; and wherein the third API request is processed by a second component of the third logically isolated instance of the service, and wherein the third logically isolated instance of the service corresponds to the first service availability zone.

In some embodiments, the operations further include generating a schedule for deploying an update to the service, wherein the schedule causes the update to be deployed to the first logically isolated instance of the service at a first time and deployed to the second logically isolated instance of the service at a second time that is different from the first time; and deploying the update to the first logically isolated instance of the service and to the second logically isolated instance of the service according to the schedule.

In some embodiments, the operations further include receiving a request to describe the plurality of logically isolated instances of the service associated with the region of the cloud provider network; and sending a response identifying the plurality of logically isolated instances of the service associated with the region.

In some embodiments, a portion of the first request is encrypted using an encryption key associated with the first logically isolated instance of the service, and wherein the encryption key is not accessible to resources of the second logically isolated instance of the service.

In some embodiments, an identifier of the first logically isolated instance of the service is associated with authentication information provided, by an identity and access management service of the cloud provider network, to an entity sending the first request.

In some embodiments, the service is a first service of a plurality of services provided by the cloud provider network, and the operations further include: sending, by a component of the first service and to a second service of the plurality of services, a third API request via a service mesh of the cloud provider network, wherein the third API request identifies the first logically isolated instance of the first service; and wherein the third API request is routed, by the service mesh, to a logically isolated instance of the second service corresponding to the first logically isolated instance of the first service.

In some embodiments, the region is a first region, and wherein the method further comprises: generating a schedule for deploying an update to the service, wherein the schedule causes the update to be deployed to the first logically isolated instance of the service at a first time and deployed to the second logically isolated instance of the service at a second time that is different from the first time, and wherein the schedule further causes the update to be deployed to the first region at a third time and to a second region at a fourth time that is different from the third time; and deploying the update to the first logically isolated instance of the service, the second logically isolated instance of the service, the first region, and the second region according to the schedule.

In some embodiments, the operations further include replicating changes to the first resource in the first logically isolated instance of the service to the second resource in the second logically isolated instance of the service.

In some embodiments, the operations further include determining that the first resource in the first logically isolated instance of the service has failed; and executing a failover workflow associated with the first resource, wherein executing the failover workload includes redirecting requests directed to the first resource to the second resource in the second logically isolated instance of the service.

In some embodiments, the first logically isolated instance of the service is isolated from each of the plurality of logically isolated instances of the service based on one or more of: separate hardware resources, separate control plane resources, separate data plane resources, separate power infrastructure, separate geographic areas, or separate networking infrastructure.

In some embodiments, an implementation of the service is dependent upon one or more other services of the cloud provider network, and the service is one of: a database service, a data streaming service, a message queueing service, a storage service, a container service, a backup service, a networking service, or an analytics service.

In some embodiments, a correspondence exists between the plurality of logically isolated instances of the service and a plurality of physical availability zones associated with the region.

In some embodiments, each logically isolated instance of the plurality of logically isolated instances of the service is identified by a distinct color name, and wherein the first request includes a first color name identifying the first logically isolated instance of the service and the second request includes a second color name identifying the second logically isolated instance of the service.

Figure 7:
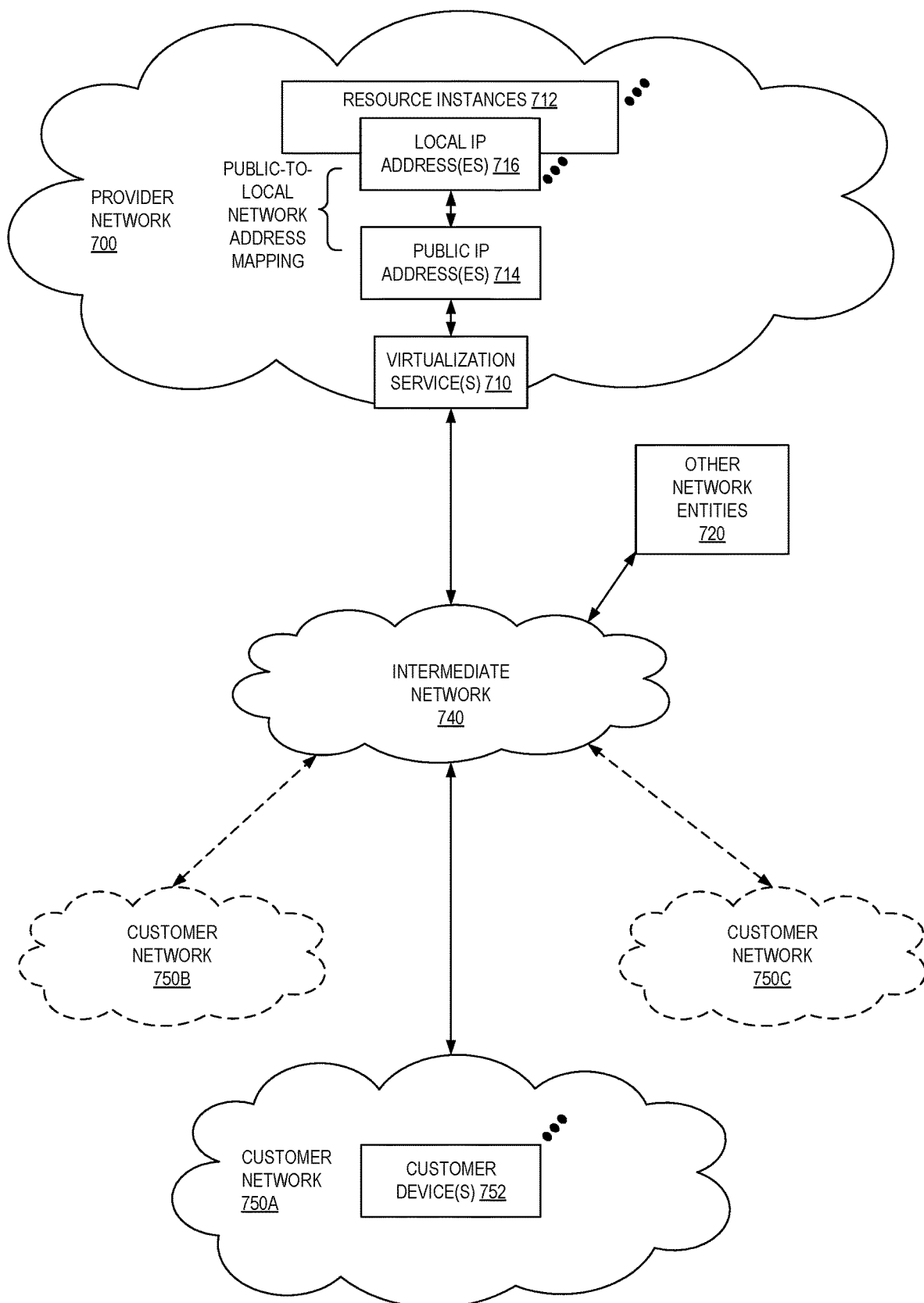
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, can allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
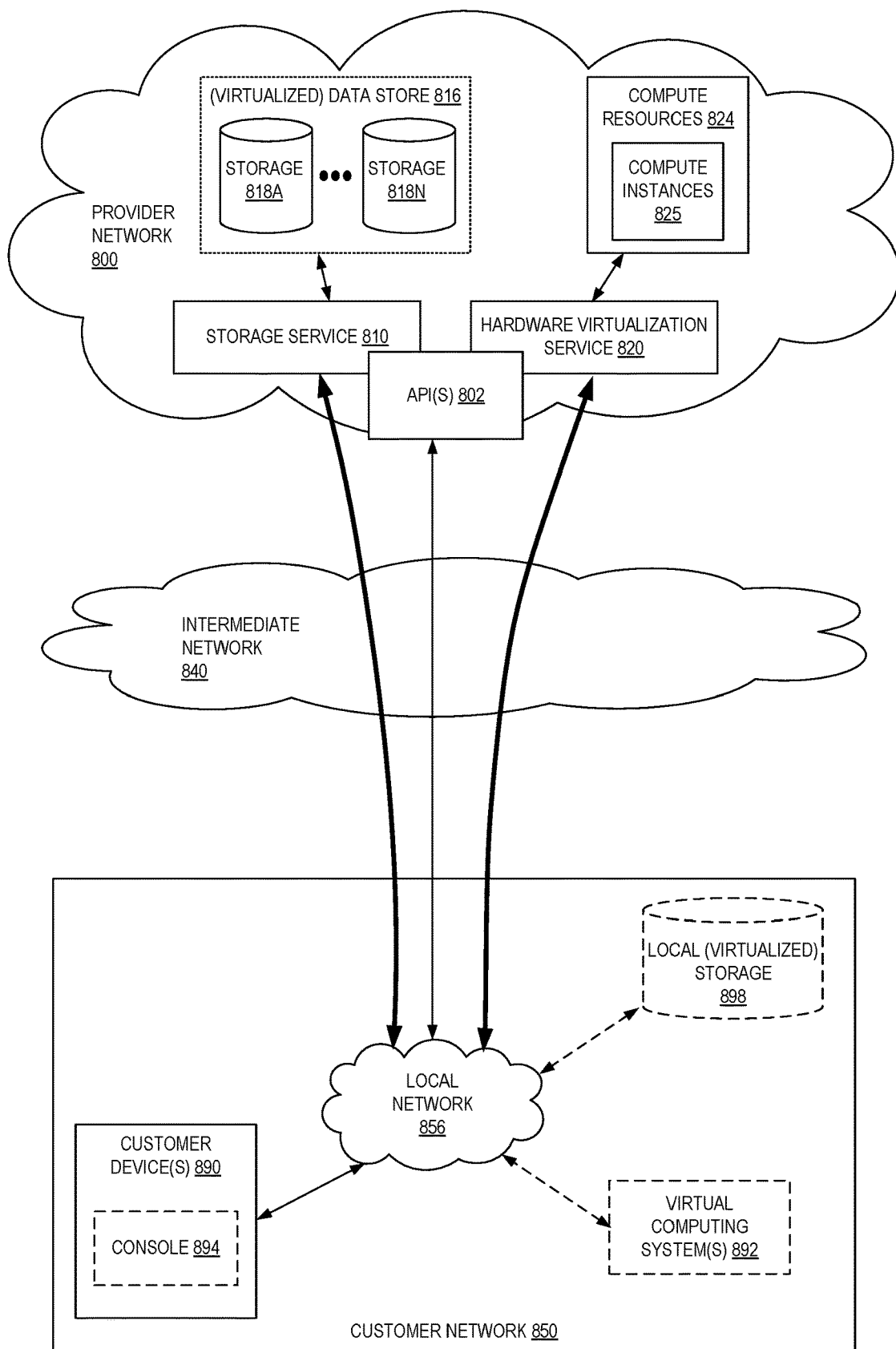
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, provided as a service (e.g., for some fee) to customers of the provider network 800 (e.g., to a customer that implements customer network 850). Each computation resource 824 can be provided with one or more local IP addresses. Provider network 800 can be configured to route packets from the local IP addresses of the compute resources 824 to public Internet destinations, and from public Internet sources to the local IP addresses of compute resources 824.

Provider network 800 can provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 can provide one or more APIs 802, for example a web services interface, via which a customer network 850 can access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is provided as a service to customer network 850.

From an instance of a virtual computing system 892 and/or another customer device 890 (e.g., via console 894), the customer can access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with storage service 810 via one or more communications channels to upload new or modified data from a local cache so that the primary store of data (virtualized data store 816) is maintained. In some embodiments, a user, via a virtual computing system 892 and/or on another customer device 890, can mount and access virtual data store 816 volumes via storage service 810 acting as a storage virtualization service, and these volumes can appear to the user as local (virtualized) storage 898.

While not shown in FIG. 8, the virtualization service(s) can also be accessed from resource instances within the provider network 800 via API(s) 802. For example, a customer, appliance service provider, or other entity can access a virtualization service from within a respective virtual network on the provider network 800 via an API 802 to request allocation of one or more resource instances within the virtual network or within another virtual network.

Figure 9:
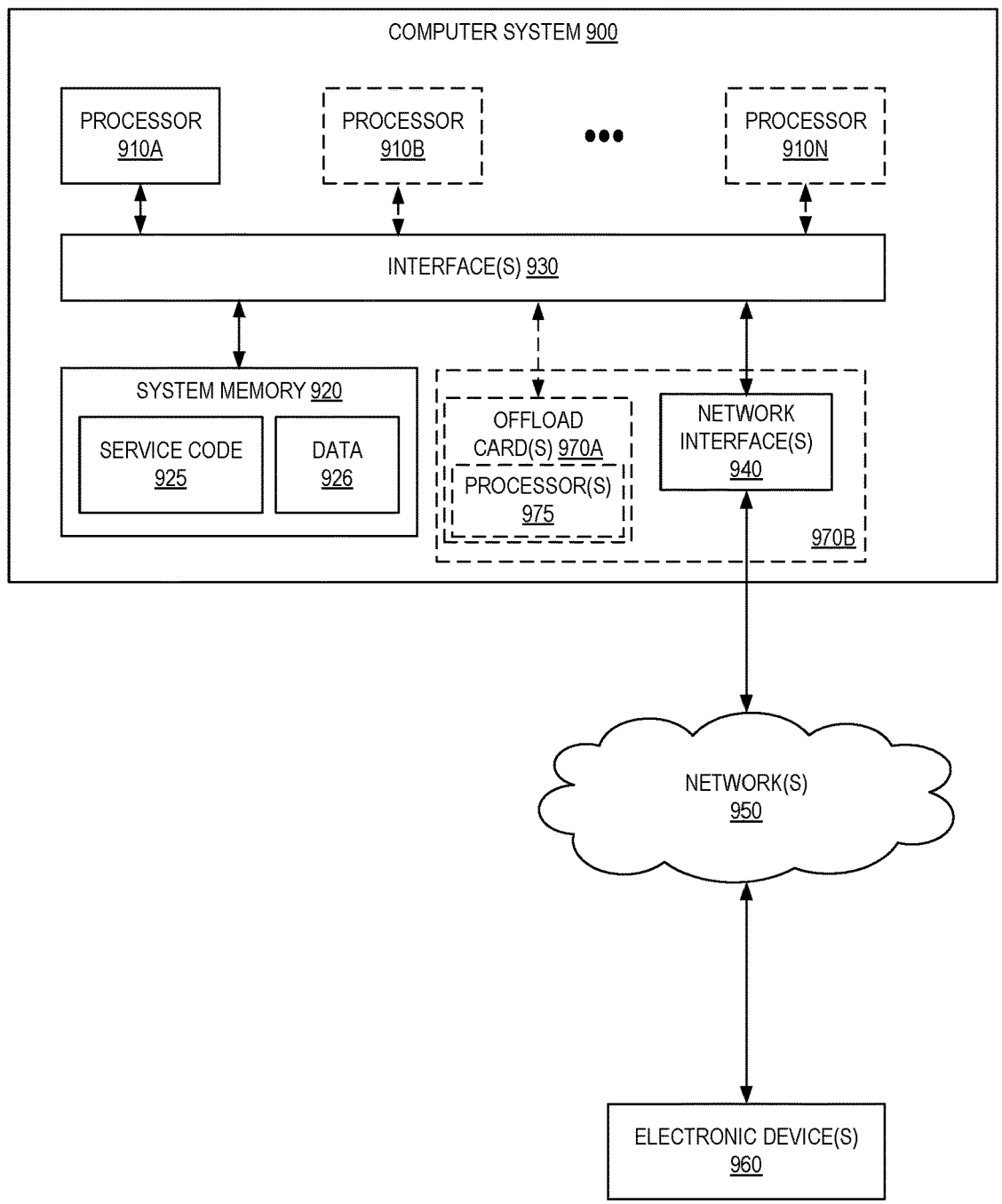
FIG. 9 is a block diagram illustrating an example computer system that may be used in some embodiments.

In some embodiments, a system that implements a portion or all of the techniques described herein can include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 can include one computing device or any number of computing devices configured to work together as a single computer system 900.

In various embodiments, computer system 900 can be a uniprocessor system including one processor 910, or a multiprocessor system including several processors 910 (e.g., two, four, eight, or another suitable number). Processors 910 can be any suitable processors capable of executing instructions. For example, in various embodiments, processors 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 can store instructions and data accessible by processor(s) 910. In various embodiments, system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as service code 925 and data 926.

In one embodiment, I/O interface 930 can be configured to coordinate I/O traffic between processor 910, system memory 920, and any peripheral devices in the device, including network interface 940 or other peripheral interfaces. In some embodiments, I/O interface 930 can perform any necessary protocol, timing or other data transformations to convert data signals from one component (e.g., system memory 920) into a format suitable for use by another component (e.g., processor 910). In some embodiments, I/O interface 930 can include support for devices attached through various types of peripheral buses, such as a variant of the Peripheral Component Interconnect (PCI) bus standard or the Universal Serial Bus (USB) standard, for example. In some embodiments, the function of I/O interface 930 can be split into two or more separate components, such as a north bridge and a south bridge, for example. Also, in some embodiments some or all of the functionality of I/O interface 930, such as an interface to system memory 920, can be incorporated directly into processor 910.

Network interface 940 can be configured to allow data to be exchanged between computer system 900 and other devices 960 attached to a network or networks 950, such as other computer systems or devices as illustrated in FIG. 1, for example. In various embodiments, network interface 940 can support communication via any suitable wired or wireless general data networks, such as types of Ethernet network, for example. Additionally, network interface 940 can support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 can be one embodiment of a computer-accessible medium configured to store program instructions and data as described above. However, in other embodiments, program instructions and/ or data can be received, sent or stored upon different types of computer-accessible media. Generally speaking, a computer-accessible medium can include non-transitory storage media or memory media such as magnetic or optical media, e.g., disk or DVD/CD coupled to computer system 900 via I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of computer system 900 as system memory 920 or another type of memory. Further, a computer-accessible medium can include transmission media or signals such as electrical, electromagnetic, or digital signals, conveyed via a communication medium such as a network and/or a wireless link, such as can be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a first service of a plurality of services provided by a cloud provider network, the first service configured to provide a resource to users of the cloud provider network, a first application programming interface (API) request to create redundant copies of the resource, wherein the first API request causes the first service to identify first and second service availability zones of a plurality of service availability zones, wherein each of the plurality of service availability zones is associated with a respective one of a plurality of logically isolated instances of the service within a region of the cloud provider network, and wherein the region further includes a plurality of physical availability zones used by other services of the cloud provider network, and wherein the first service has a dependency on a second service of the plurality of services;
creating a first copy of the resource using a first logically isolated instance of the first service associated with the first service availability zone of the plurality of service availability zones;
creating a second copy of the resource using a second logically isolated instance of the first service associated with the second service availability zone of the plurality of service availability zones;

sending, by the first service to the second service, a second API request involving the first copy of the resource, wherein the second API request includes an identifier of the first service availability zone of the first service; and wherein the second API request is processed by a logically isolated instance of the second service, wherein the logically isolated instance of the second service is associated with a service availability zone of the second service that shares the identifier with the first service availability zone of the first service.

2. The computer-implemented method of claim 1, wherein the resource is a first resource, and wherein the method further comprises:

receiving a second API request to create redundant copies of a workload that requires the first resource and a second resource provided by a second service of the cloud provider network;

creating a first copy of the second resource using a first logically isolated instance of the second service associated with the first service availability zone, wherein the first copy of the first resource and the first copy of the second resource cooperate to form a first copy of the workload;

creating a second copy of the second resource using a second logically isolated instance of the second service associated with the second service availability zone, wherein the second copy of the first resource and the second copy of the second resource cooperate to form a second copy of the workload;

determining that first copy of the first resource or the first copy of the second resource is unavailable; and executing a failover workflow, wherein executing the failover workflow includes redirecting requests directed to the first copy of the first resource or to the first copy of the second resource to the second copy of the first resource or to the second copy of the second resource.

3. The computer-implemented method of claim 1, further comprising:

generating a schedule for deploying an update to the first service, wherein the schedule causes the update to be deployed to the first service availability zone at a first time and deployed to the second service availability zone at a second time that is different from the first time; and deploying the update to the first service availability zone and to the second service availability zone according to the schedule.

4. A computer-implemented method comprising:

receiving, by a first service of a plurality of services provided by a cloud provider network, a first request to create a first resource provided by the first service in a region of the cloud provider network, wherein the region includes a plurality of service availability zones, wherein each service availability zone of the plurality of service availability zones includes a separate application-layer copy of the first service, wherein the first request identifies a first availability zone of the plurality of service availability zones at which to create the first resource, and wherein the first service has a dependency on a second service of the plurality of services;

creating the first resource using a first logically isolated instance of the first service associated with the first service availability zone;

receiving a second request to create a second resource, wherein the second request identifies a second service availability zone of the plurality of service availability zones;

creating the second resource using a second logically isolated instance of the first service associated with the second service availability zone;

sending, by the first service to the second service, a third request involving the first resource, wherein the third request includes an identifier of the first service availability zone; and wherein the third request is processed by a logically isolated instance of the second service, wherein the logically isolated instance of the second service is associated with a service availability zone of the second service that shares an identifier with the first service availability zone of the first service.

5. The computer-implemented method of claim 4, further comprising:

generating a schedule for deploying an update to the first service, wherein the schedule causes the update to be deployed to the first logically isolated instance of the first service at a first time and deployed to the second logically isolated instance of the first service at a second time that is different from the first time; and deploying the update to the first logically isolated instance of the first service and to the second logically isolated instance of the first service according to the schedule.

6. The computer-implemented method of claim 4, further comprising:

receiving a request to describe a plurality of logically isolated instances of the first service associated with the region of the cloud provider network; and sending a response identifying the plurality of logically isolated instances of the first service associated with the region.

7. The computer-implemented method of claim 4, wherein a portion of the first request is encrypted using an encryption key associated with the first logically isolated instance of the first service, and wherein the encryption key is not accessible to resources of the second logically isolated instance of the first service.

8. The computer-implemented method of claim 4, wherein an identifier of the first logically isolated instance of the first service is associated with authentication information provided, by an identity and access management service of the cloud provider network, to an entity sending the first request.

9. The computer-implemented method of claim 4, wherein the method further comprises:

sending, by a component of the first service and to the second service of the plurality of services, a third request via a service mesh of the cloud provider network, wherein the third request identifies the first logically isolated instance of the first service; and wherein the third request is routed, by the service mesh, to a logically isolated instance of the second service corresponding to the first logically isolated instance of the first service.

10. The computer-implemented method of claim 4, wherein the region is a first region, and wherein the method further comprises:

generating a schedule for deploying an update to the first service, wherein the schedule causes the update to be deployed to the first logically isolated instance of the first service at a first time and deployed to the second logically isolated instance of the first service at a second time that is different from the first time, and wherein the schedule further causes the update to be deployed to the first region at a third time and to a second region at a fourth time that is different from the third time; and deploying the update to the first logically isolated instance of the first service, the second logically isolated instance of the first service, the first region, and the second region according to the schedule.

11. The computer-implemented method of claim 4, further comprising replicating changes to the first resource in the first logically isolated instance of the first service to the second resource in the second logically isolated instance of the first service.

12. The computer-implemented method of claim 4, further comprising:
determining that the first resource in the first logically isolated instance of the first service has failed; and
executing a failover workflow associated with the first resource, wherein executing the failover workflow includes redirecting requests directed to the first resource to the second resource in the second logically isolated instance of the first service.

13. The computer-implemented method of claim 4, wherein the first logically isolated instance of the first service is isolated from the second logically isolated instance of the first service based on one or more of: separate hardware resources, separate control plane resources, separate data plane resources, separate power infrastructure, separate geographic areas, or separate networking infrastructure.

14. The computer-implemented method of claim 4, wherein the second service is one of: a database service, a data streaming service, a message queueing service, a storage service, a container service, a backup service, a networking service, or an analytics service.

15. The computer-implemented method of claim 4, wherein a correspondence exists between a plurality of logically isolated instances of the first service and a plurality of physical availability zones associated with the region.

16. The computer-implemented method of claim 4, wherein each service availability zone of the plurality of service availability zones is identified by a distinct color name, and wherein the first request includes a first color name identifying the first service availability zone and the second request includes a second color name identifying the second service availability zone.

17. The computer-implemented method of claim 4, further comprising mapping the first request to the first logically isolated instance of the first service by applying a consistent hash algorithm to a service availability zone identifier included in the first request.

18. A system comprising:
a first one or more electronic devices to implement a first application-layer copy of a first service in a region of a multi-tenant provider network, wherein the region includes a plurality of service availability zones, wherein each service availability zone of the plurality of service availability zones includes a separate application-layer copy of the first service, wherein the first service has a dependency on a second service of a plurality of services provided by the multi-tenant provider network, and wherein the first application-layer copy of the first service includes instructions that upon execution cause the first application-layer copy of the first service to:
receive a first request to create a first resource provided by the first service in the region of the multi-tenant provider network, wherein the first request identifies a first service availability zone that contains the first application-layer copy of the first service, and
create the first resource in the first service availability zone of the first service; and a second one or more electronic devices to implement a second application-layer copy of the first service in a second service availability zone of the plurality of service availability zones, wherein the second application-layer copy of the first service includes instructions that upon execution cause the second application-layer copy of the first service to:
receive a second request to create a second resource, wherein the second request identifies the second service availability zone that contains the second application-layer copy of the first service, and
create the second resource in the second service availability zone of the first service,
send, by the first service to the second service, a third request involving the second resource, wherein the third request includes an identifier of the first service availability zone, and
wherein the third request is processed by a logically isolated instance of the second service, wherein the logically isolated instance of the second service is associated with a service availability zone of the second service that shares an identifier with the first service availability zone of the first service.

* * * * *